United States Patent [19]

Jenner

[11] 4,152,048

[45] May 1, 1979

[54] STEREOSCOPIC VIEWER

[75] Inventor: James L. C. Jenner, Toronto, Canada

[73] Assignee: Stereoscopics Inc., Toronto, Canada

[21] Appl. No.: 810,255

[22] Filed: Jun. 27, 1977

[51] Int. Cl.² ............................................. G02B 27/04
[52] U.S. Cl. ................................................... 350/140
[58] Field of Search .......................................... 350/140

[56] References Cited

U.S. PATENT DOCUMENTS

| 2,934,999 | 5/1960 | Baumel | 350/140 |
| 3,562,939 | 2/1971 | Jacobs et al. | 350/140 |
| 3,734,596 | 5/1973 | Merlich | 350/140 |
| 3,756,699 | 9/1973 | Martin | 350/140 |

FOREIGN PATENT DOCUMENTS 448260 5/1949 Italy ........................................ 350/140

Primary Examiner—Jon W. Henry
Attorney, Agent, or Firm—Rogers, Bereskin & Parr

[57] ABSTRACT

A viewer for a stereoscopic film slide is assembled from a cardboard blank and includes front and rear portions defining therebetween a slot to receive the slide. The slot has open ends and an open top and the rear portion of the viewer is displaceable rearwardly to open the slot to a generally V-shaped configuration for insertion of the film slide into and removal thereof from the slot. The rear portion of the viewer is maintained in its normal position by an elastic tension member which extends diagonally of said portion.

9 Claims, 7 Drawing Figures

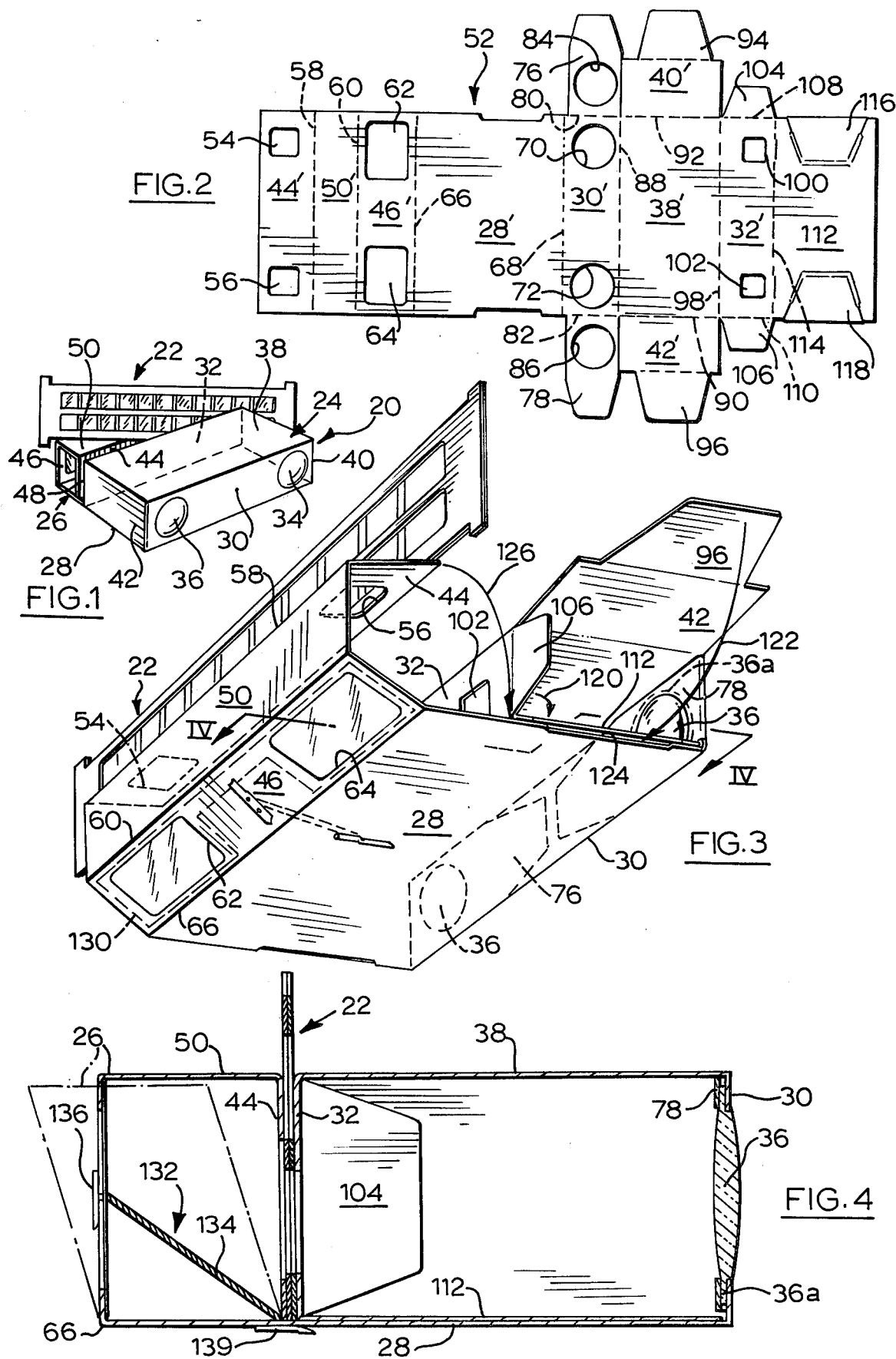

STEREOSCOPIC VIEWER

This invention relates to viewers for stereoscopic photographic transparencies.

It has previously been proposed to make relatively simple stereoscopic viewers from folded cardboard blanks. Examples of such viewers are disclosed in U.S. Pat. Nos. 2,643;678; 2,934,999; and 3,734,596. Viewers of this general type are intended to be used for viewing transparencies mounted in a cardboard carrier which can be inserted into the viewer to bring the transparencies into positions for viewing. In one example, the transparency carrier is in the form of a slide which can be inserted into and displaced through corresponding openings in opposite side walls of the viewer. In another example, the viewer has a slot in a top wall thereof and the carrier is in the form of a card which is inserted vertically downwardly through the slot. The card carries two pairs of transparencies and can be inserted in the viewer in one of two positions for viewing one of the pairs. When the other pair is to be viewed, the transparency must be removed, inverted and re-inserted.

Viewers made from cardboard blanks have advantages in that they are relatively inexpensive to manufacture and that they may be designed to be collapsible for ease of storage. However, a problem with prior art viewers of the kind referred to above is that they have been designed to accept transparency carriers including only a small number of transparencies. Accordingly, the range of application of such viewers has been somewhat limited.

An object of the present invention is to provide an improved stereoscopic viewer capable of accepting a transparency carrier including a relatively large number of photographic transparencies.

According to the invention, the viewer is intended to receive a film slide which includes a plurality of pairs of stereoscopic photographic transparencies. The viewer includes front and rear portions of rectangular box shape, having a common bottom wall. The front portion of the viewer includes first and second walls which upstand from the bottom wall in spaced, parallel positions and define respectively a front wall and a first intermediate wall of the viewer. A top wall extends between the front wall and the first intermediate wall. End walls define a substantially light-tight enclosure with said front wall, said first intermediate wall, and said top and bottom walls. A pair of lenses are spaced transversely of the front wall for viewing the transparencies in use. The rear position of the viewer includes first and second walls spaced longitudinally of the bottom wall and defining respectively a second intermediate wall and a rear wall of the viewer. The second intermediate wall is disposed immediately adjacent the first intermediate wall of the front portion of the viewer and defines therewith a slot having open ends and an open top for receiving said film slide. The rear wall adjoins the bottom wall at a hinge line. A top wall extends between the second intermediate wall and the rear wall and adjoins said walls at respective hinge lines. The second intermediate wall is inclinable with respect to the first intermediate wall by displacing said top wall rearwardly of the viewer to open said slot to a generally V-shaped configuration for insertion of said film slide into and removal thereof from said slot. The first and second intermediate walls are formed with respective pairs of openings which are aligned generally with the transparencies in each pair on the film slide, and the rear wall is formed with at least one opening through which light enters the viewer for illuminating the transparencies in use. An elastic tension member extends generally diagonally of the rear portion of the viewer and is arranged to normally maintain said portion in a configuration in which the second intermediate wall and rear walls are disposed generally parallel to the front wall and first intermediate wall of the front portion of the viewer.

In order that the invention may be more clearly understood, reference will now be made to the accompanying drawings which illustrate one embodiment thereof by way of example, and in which:

FIG. 1 is a perspective view of a viewer according to the invention with a film slide partly inserted therein;

FIG. 2 is a plan view of a cardboard blank from which the viewer of FIG. 1 is assembled;

FIG. 3 is a perspective view of the blank of FIG. 2 in a partly assembled condition;

FIG. 4 is a longitudinal sectional view through the assembled viewer, taken generally on line IV—IV of FIG. 3;

Figure 5:
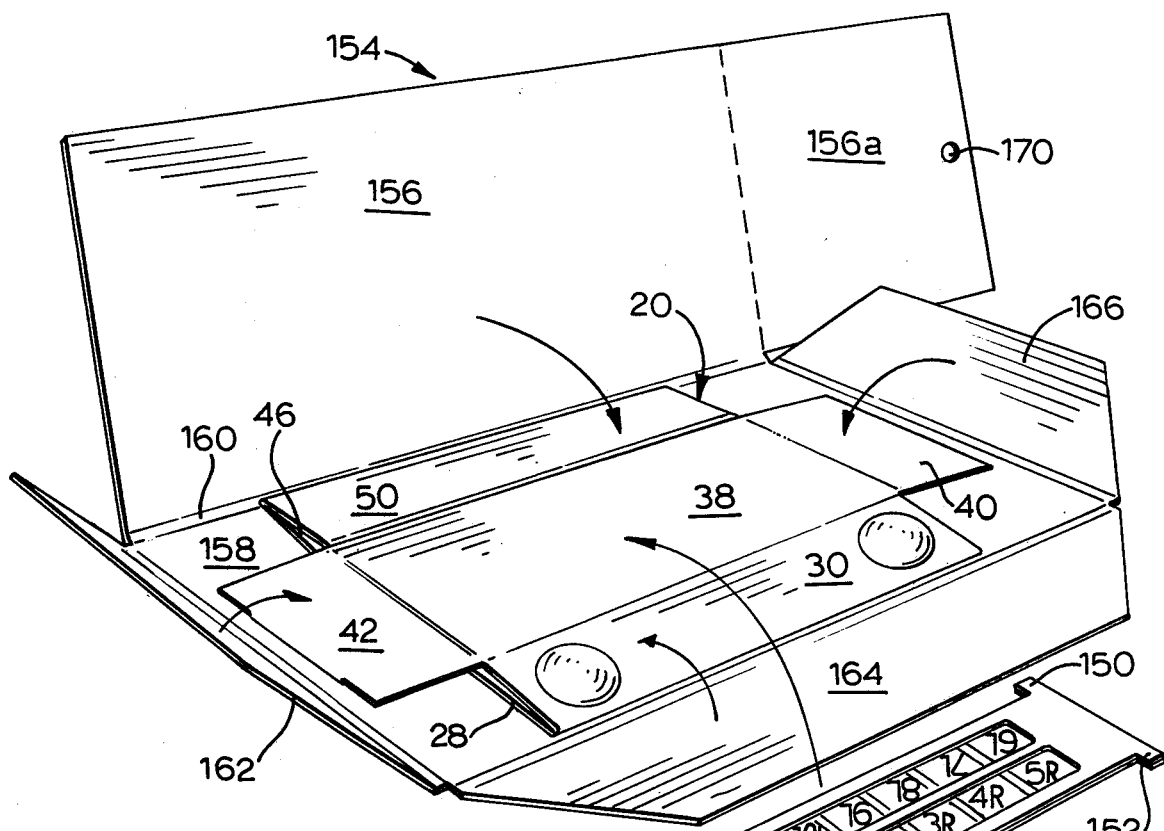
FIG. 5 shows the viewer of the previous figures in a collapsed condition in a combined display and mailing container.

The viewer shown in the drawings is assembled from a cardboard blank as will be described and is designed to be collapsible for ease of storage and transportation. In fact, the particular viewer illustrated has been designed so that it can be sold in a form suitable for mailing along with one or more film slides in a mailing container such as that shown in FIGS. 5 to 7. It is however to be understood that there is no limitation in this respect.

Referring first to FIG. 1, the viewer is generally denoted 20 and a film slide for insertion in the viewer is denoted 22. Slide 22 carries stereoscopic pairs of photographic transparencies as will be described. The viewer includes front and rear portions 24 and 26 respectively having a common bottom wall 28. The front portion 26 includes first and second walls 30 and 32 respectively which upstand from the bottom wall 28. Wall 30 forms the front wall of the viewer, while wall 32 forms a first intermediate wall. A pair of lenses 34, 36 are spaced transversely of the front wall 30 for use in viewing the transparencies on slide 22.

A top wall 38 extends between the front wall 30 and the first intermediate wall 32 of the viewer. End walls 40 and 42 define with the other walls of the front portion 26, an enclosure which is substantially light-tight within the limitations of folded cardboard construction, except for the lenses 34 and 36 and two viewing apertures (to be described) in wall 32.

The rear portion 26 of the viewer includes first and second walls 44 and 46 which are spaced longitudinally of the bottom wall 28 and which define respectively a second intermediate wall and a rear wall of the viewer. It will be noted that the second intermediate wall 44 is disposed immediately adjacent the first intermediate wall 32 of the front portion of the viewer and defines therewith a slot 48 having open ends and an open top for receiving the film slide 22. A top wall 50 extends between the second intermediate wall 44 and a rear wall 46. The rear portion 26 of the viewer is open-ended.

Reference will now be made to FIG. 2 in describing the blank from which the viewer is assembled. The blank is denoted 52 and is die cut from relatively light cardboard stock in the shape shown in FIG. 2 (in which the inner surface of the blank is uppermost). The blank includes a plurality of rectangular panels which are disposed in a series extending longitudinally of the blank, and which adjoin one another at fold lines indicated by dotted lines. Those panels which form the walls of the assembled viewer referred to previously are identified by primed reference numerals corresponding to the numerals used to denote the corresponding walls in FIG. 1. For example, the panel at the extreme left hand end of the blank as viewed in FIG. 2 is denoted 44' and forms the second intermediate wall 44 of the rear portion of the viewer. This panel is formed with two rectangular openings 54 and 56, each of a size corresponding generally to the size of one of the photographic transparencies in film slide 22. The openings are spaced to correspond with the spacing between respective transparencies in each pair on the slide. Adjacent panel 44' is a panel 50' which forms the top wall of the rear portion of the viewer, and which adjoins panel 44' at a fold line 58. The next panel in the series is panel 46' which adjoins panel 50' at a fold line 60, and which forms the rear wall 46' of the viewer. Two apertures 62 and 64 are provided in panel 46' in positions corresponding generally to the positions of the apertures 54 and 56 in panel 44', for the purpose of admitting light to the interior of the viewer as will be described.

Panel 28' forms the bottom wall of the viewer and adjoins panel 46' at a fold line 66 which defines a hinge between the rear wall of the viewer and the bottom wall in the assembled viewer. At its edge opposite fold line 66, panel 28' adjoins a panel 30', which forms the front wall of the viewer. The fold line between panels 28' and 30' is denoted 68. Panel 30' is formed with two circular openings 70 and 72 intended to receive the two circular lenses 34 and 36 shown in FIG. 1. The lenses are held in place by two flaps 76 and 78 which adjoin opposite end edges of panel 30' at fold lines 80 and 82 and which are formed with respective openings 84 and 86 positioned to co-operate with the corresponding openings in panel 30' when the tabs 76 and 78 are folded inwardly. Thus, each lens is of circular shape with a thin peripheral flange as indicated at 36a in FIGS. 3 and 4 and is received in the appropriate one of the openings in panel 30'. The lenses are held in place by folding the associated tabs 76 and 78 inwardly and securing the tabs by adhesive to the inner surface of the panel so that their peripheral flanges are trapped between the tabs and wall 30.

Panel 38' forms the top wall of the front portion 24 of the viewer. It adjoins panel 30' at a fold line 88 and has at opposite ends thereof, the panels 40' and 42' which define the end walls of the front portion of the viewer. Fold lines 90 and 92 are provided between panel 38' and the end panels 40' and 42' respectively. These panels have respective outwardly extending tabs 94 and 96 which are used to secure the end walls in the positions in which they are shown in FIG. 1, as will be more specifically described in connection with FIG. 3.

Adjacent panel 38' is a panel 32' which forms the first intermediate wall of the viewer, and which adjoins panel 38' at a fold line 98. Panel 32' is formed with generally rectangular openings 100 and 102 positioned to correspond with the openings 54 and 56 in panel 44'. Further, panel 32' has at its ends tabs 104 and 106 which adjoin the panel at fold lines 108 and 110. The panel at the right hand end of the blank is denoted 112 and adjoins panel 32' at a fold line 114. Panel 112 forms an inner bottom wall of the front portion of the viewer in its assembled condition. End portions of the panel 112 are formed with depressions 116 and 118 respectively which are shaped to receive the tabs 94 and 96 on the end panels 40' and 42' as will be described.

The steps involved in assembling the blank will now be described, primarily with reference to FIG. 3. The first step is to position the lenses in the openings 70 and 72 in panel 30' as mentioned previously and fold inwardly and secure to panel 30' the tabs 76 and 78. The front portion of the viewer is then assembled by successively folding inwardly the panels 112, 32', 38' and 30' to bring the front portion 24 of the viewer to the generally rectangular configuration in which it appears in FIG. 3 in which panel 112 overlies part of the bottom wall 28. Panel 112 is then secured by adhesive to the inner surface of the bottom wall. The viewer appears in this condition in FIG. 3. The tabs 104 and 106 at the ends of the first intermediate wall 32 are then folded inwardly as indicated by the arrow 120 in FIG. 3 to bring the tabs to positions in which they are disposed at right angles to panel 32'. The end panels 40' and 42' are then folded downwardly as indicated by arrow 122 and the associated end flaps 94 and 96 are tucked between the bottom wall 28 and panel 112. In this connection, it is to be noted that the depressions 116 and 118 in panel 112 (FIG. 2) define with the bottom wall 28, spaces to receive the flaps, one of which is indicated at 124 in FIG. 3. The flaps 94 and 96 are merely push-fitted into these spaces and are not retained by adhesive. It will be appreciated that insertion of these flaps rigidifies the front portion 24 of the viewer.

The next step in assembling the viewer is to fold inwardly the panels 44', 50' and 46' to form the rear portion of the viewer, as indicated by arrow 126 in FIG. 3. Thus, it will be seen that the free outer edge of end panel 44' will be brought to a position adjacent the junction between the first intermediate wall panel 32' and the bottom wall 28. Accordingly, the first and second intermediate panels 32' and 44' respectively will be disposed immediately adjacent one another and define said slot 48 for receiving the film slide 22. The respective pairs of openings 62, 64; 54, 56 and 100, 102 in the panels 46', 44', and 32' respectively will be optically aligned with one another and with the lenses in the front wall at this time so that two corresponding transparencies in the film slide 22 can be viewed through the lenses and will be illuminated by light entering the viewer through the rear wall openings 62 and 64. A screen indicated at 130 in FIG. 3, of a translucent plastic material, is secured by adhesive to the inner surface of the rear wall 46 to diffuse incoming light.

FIG. 4 is a longitudinal sectional view through the assembled viewer and shows the film slide 22 in the slot 48 defined between the first and second intermediate walls 32 and 44 respectively of the viewer. It will be seen that both the front portion 24 and the rear portion 26 of the viewer adopts a rectangular configuration at this time. The rear portion 26 is retained in this configuration by an elastic tension member 132 which extends generally diagonally of portion 26. In this embodiment, the member 132 is formed by a length of elastic 134 which extends through an opening in the rear wall 46 between the openings 62 and 64, and an opeing in the bottom wall 28 adjacent intermediate wall 44, and which is fitted with tags 136 and 138 at its ends. As a result of the action of member 132, the rear end portion 26 of the viewer is urged against the film slide 22 so that the slide is frictionally retained in slot 48, whereby the transparencies are positively located in relation to the openings in the intermediate walls of the viewer.

It will also be appreciated that the design of the rear end portion 26 of the viewer allows the slot 48 to be opened to a V-shaped configuration to facilitate insertion of the film slide into and removal thereof from the slot 48. This will normally be accomplished by displacing rearwardly of the viewer the top wall 50 of the rear end portion 26 to cause the portion to, in effect, distort from its normal rectangular shape to the parallelogram shape indicated in chain dotted line in FIG. 4. The film slide 22 can then be readily removed from or displaced in the film slot without the frictional restraint imposed by the rear end portion 26 of the viewer. As soon as portion 26 is released, however, the elastic tension member 132 will cause it to return to its rectangular configuration, restraining the film slide in slot 48.

The film slide 22 is shown in front view in FIG. 5 (to be described). The slide is in the form of a cardboad carrier 140 formed by two thin cardboard sheets between which is secured a film strip which includes a plurality of individual photographic transparencies indicated at 142. The transparencies are arranged in two rows in carrier 140 and each row includes a plurality of stereoscopic pairs of transparencies. The transparencies in each pair are denoted by the same numeral and the left hand transparency in each pair is designated by the suffix L, while the right hand transparency is indicated by the suffix R. Thus, it will be seen that the bottom row of transparencies in the carrier includes five pairs denoted 1L-1R to 5L-5R. The top row includes a further five pairs of transparencies denoted 6L-6R to 10L-10R. The transparencies in the two rows are inverted with respect to one another and the series of transparencies in each row runs from left to right of the row as seen when the row is oriented for viewing. Accordingly, the slide is initially disposed in the viewer in its extreme right hand position as seen in FIG. 1 in which views 1L and 1R are aligned with the openings in the first and second intermediate walls of the viewer and with the lenses 34 and 36. To view subsequent transparencies in that row, the slide is moved in steps to the left. When the slide reaches its extreme left hand position, it is removed from the viewer as described previously, inverted and re-inserted in slot 44. Again starting from the extreme right hand position, the viewer is then moved incrementally in steps to the left for viewing of transparencies 6L-6R to 10L-10R. Accordingly, ten pairs of transparencies can be viewed in sequence.

The film slide carrier 140 is shaped to define projections 146, 148 and 150, 152 at its ends, which abut with the bottom wall 28 of the viewer when the film slide is in its extreme left and right hand positions. The projections are spaced from the transparencies so that they serve to orient the film slide longitudinally with the appropriate pair of transparencies positioned ready for viewing. For example, when projection 148 is in contact with the relevant edge of the bottom wall 28 as seen in FIG. 1, transparencies 1L and 1R are positioned for viewing.

Figure 6:
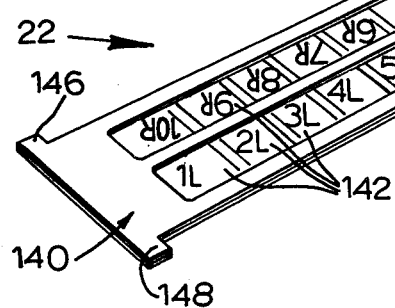
FIG. 6 is a perspective view showing the container of FIG. 5 on display.
Figure 7:
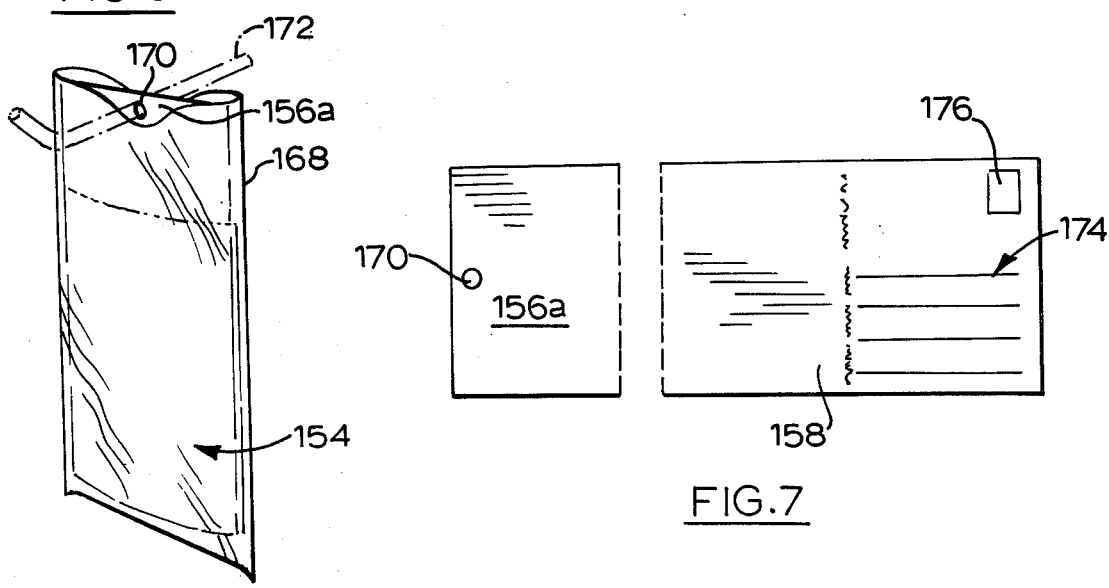
FIG. 7 shows the container ready for mailing.

As indicated previously, it is intended that the viewer of FIGS. 1 to 4 will be sold in a collapsed condition in a mailing container of the form shown in FIGS. 5 to 7. The viewer is shown in its collapsed condition in FIG. 5 and the mailing container is shown partly assembled at 154. The viewer is collapsed by disengaging the tabs 94 and 96 on the end walls 40 and 42 respectively of the front viewer portion so that these parts of the viewer adopt generally the positions shown in FIG. 3, and flattening the viewer so that the top walls 38 and 50 of the front and rear viewer portions fold down onto the bottom wall 28. The viewer is shown generally in this condition in FIG. 5 with the tabs 94 and 96 folded under the end walls 40 and 42. It will of course be appreciated that the viewer will not normally have been previously assembled when it is placed in the mailing container in practice; the viewer will be partly assembled from a blank generally into the form shown in FIG. 3 and then will be collapsed as described and placed inside the mailing container.

Container 154 is generally of envelope form. It includes rectangular front and rear panels 156 and 158 respectively connected at a fold line 160. Fold-in tabs 162, 164 and 166 are provided at the respective outer edges of the rear panel 158 and are adhesively coated on their outer surfaces. To assemble the mailing container, the collapsed viewer 20 is placed on the inner surface of the rear wall 158 as shown in FIG. 5. One or more film slides 22 are then placed on top of the viewer, together with any appropriate descriptive material (not shown). The tabs 162, 164 and 166 are then folded inwardly and the front panel 154 is folded down onto the tabs and secured by the adhesive thereon. The assembled package is then inserted into a flexible plastic envelope such as that indicated at 168 in FIG. 6. The front panel 154 of the mailing container is perforated at 170 to receive a suspension element 172 of a display rack in a store or the like.

The outer surface of the mailing container is printed with appropriate descriptive and/or decorative material. In addition, the outer surface of the rear panel 158 is printed to define space for an address as indicated at 174 and for a stamp as indicated at 176. The front panel 156 of the mailing container is slightly longer than the rear panel 158 and includes an end portion 156a in which the perforation 170 is formed. This portion is detachable from the remainder of the panel by tearing along a line of perforations 178 when the package is ready for mailing.

It will be appreciated that the viewer provided by the invention is relatively simple and inexpensive to manufacture and is readily collapsible for ease of storage and/or mailing as described. Also, the viewer design allows for use of a film slide bearing a relatively large number of transparencies for viewing. This is a significant advantage compared with prior art viewer designed to accept transparency carriers having only a small number of transparencies thereon. In this connection, it is to be noted that the preceding description relates to a specific embodiment of the invention only, and that many modifications are possible within the broad scope of the invention. For example, the film slide 22 shown in the drawings is an example only and that a longer film slide having a greater number of transparencies could be used. The viewer could be constructed somewhat differently from that shown in the drawings. The second intermediate wall of the rear portion of the viewer could be permanently attached to the bottom wall 28, e.g. by hinged adhesive tab. Further, it is not essential that the viewer be collapsible. The end walls of the front portion of the viewer could be permanently secured in place, for example, if the viewer was intended to be used in an environment in which collapsibility was not important. The elastic tension member 132 may of course be of a form other than that specifically described. For example, in other embodiments, a metal coil spring or an elastic rubber element could be used. Also, the mailing container may be somewhat different from that specifically described. The mailing container may be in the form of an envelope having perforations extending along marginal portions thereof so that the container can be opened by tearing along said perforations and removing said marginal portions of the envelope.

Finally, it is to be noted that the term photographic transparency as used herein is to be interpreted broadly as denoting simply an image on film whether the image appears as an individual photograph frame or as part of a filmstrip.

What I claim is:

1. A viewer for a film slide including a plurality of pairs of stereoscopic photographic transparencies, the viewer comprising front and rear portions of rectangular box shape, having a common bottom wall;

said front portion including:

first and second walls which upstand from said bottom wall in spaced parallel positions and define respectively a front wall and a first intermediate wall of the viewer; a top wall extending between said front wall and said first intermediate wall; end walls defining with said front wall, said first intermediate wall and said top and bottom walls, a substantially light-tight enclosure; and a pair of lenses spaced transversely of said front wall for viewing the transparencies in use;

said rear portion including:

first and second walls spaced longitudinally of said bottom wall and defining respectively a second intermediate wall and a rear wall of the viewer, said second intermediate wall being disposed immediately adjacent said first intermediate wall of the front portion of the viewer and defining therewith a slot having open ends and an open top for receiving said film slide, and said rear wall adjoining said bottom wall at a hinge line; a top wall which extends between said second intermediate wall and rear wall and adjoins said walls at respective hinge lines, said second intermediate wall being inclinable with respect to said first intermediate wall by displacing said top wall rearwardly of the viewer to open said slot to a generally V-shaped configuration for insertion of said film slide into and removal thereof from said slot, said first and second intermediate walls being formed with respective pairs of openings which are aligned generally with the transparencies in each pair in the film slide, and said rear wall being formed with at least one opening through which light enters the viewer for illuminating said transparencies in use; and an elastic tension member extending generally diagonally of said rear portion of the viewer and arranged to normally maintain said portion in a configuration in which said second intermediate wall and rear wall are disposed generally parallel to said front wall and first intermediate wall of the front portion of the viewer.

2. A viewer as claimed in claim 1, wherein said rear portion of the viewer is open-ended, and wherein each of said end walls of the front portion of the viewer is coupled to one of said top and bottom walls of said portion at a hinge line and is adapted to be removably coupled to the other of said top and bottom walls when the viewer is in the assembled condition, so that said end walls can be uncoupled to permit the viewer to be collapsed into a generally flat condition.

3. A viewer as claimed in claim 2, wherein each of said end walls is coupled to said top wall of the front portion of the viewer, and includes an outwardly projecting flap, and wherein said front portion of the viewer further includes an inner bottom wall which overlies part of said common bottom wall, said flaps on the end walls being engageable between said bottom wall and said inner bottom wall to detachably couple said end walls to the bottom wall of the viewer in its assembled condition.

4. A viewer as claimed in claim 1, wherein said rear wall, top wall and second intermediate wall of the rear portion of the viewer are formed by three rectangular panels which are hingeable with respect to one another and which normally adopt a configuration in which the panels are disposed in planes mutually at right angles to one another with said second intermediate wall and rear wall parallel to the front wall and first intermediate wall of the front portion of the viewer.

5. A viewer as claimed in claim 4, wherein said elastic tension member extends through respective openings in the rear wall of the viewer and in said bottom wall adjacent said first intermediate wall, and has outer ends fitted with tags retaining the member in position.

6. A viewer as claimed in claim 1, in combination with a film slide comprising a carrier and a film strip supported by said carrier and including a plurality of pairs of stereoscopic photographic transparencies arranged in two superposed rows in which the transparencies in the respective rows are inverted with respect to one another, and wherein the slide is dimensioned so that one of said rows can be viewed with the slide in a first position in the viewer in which the slide is longitudinally displaceable in said slot, and the second row of transparencies can be viewed with the slide in a second position in the viewer in which the slide is inverted compared with its first position, and in which the slide can be displaced longitudinally for viewing of the transparencies in said second row.

7. A combination as claimed in claim 6, wherein said carrier includes, at each end, oppositely directed projections extending generally normal to the length of the slide and each positioned to define by abutment with a portion of said viewer, an end position of the slide in which one of said pairs of transparencies is appropriately located for viewing through said lenses.

8. In combination, a viewer as claimed in claim 2, disposed in a collapsed condition, at least one film slide for viewing in said viewer; and a mailing container in the form of an envelope containing said collapsed viewer and at least one film slide.

9. A blank for a collapsible stereoscopic viewer, the blank comprising a plurality of rectangular panels disposed in a series extending longitudinally of the blank and adjoining one another at fold lines, the panels defining respectively a second intermediate wall of a rear portion of the viewer; a top wall of said rear portion; a rear end wall of the viewer; a common bottom wall of the viewer; a front wall of the viewer; a top wall of a front portion of the viewer; a second intermediate wall of the viewer; and an inner bottom wall of said front portion of the viewer; said panel defining the front wall of the viewer being formed with two spaced openings to receive lenses, and said panels defining said first and second intermediate walls and said rear wall of the viewer being formed with openings aligned with said openings in the front wall of the viewer; and wherein said blank further comprises further rectangular panels disposed laterally of said panel defining the top wall of the front portion of the viewer, for forming end walls of said front portion, and outwardly projecting tabs on said end wall panels; the panels defined by the blank being dimensioned so that, on assembly of the blank, said front wall, said first and second intermediate walls, and said rear walls of the viewer upstand from said bottom wall substantially parallel to one another, and said top walls of the front and rear portions of the viewer extend generally parallel to said bottom wall, while said end walls of the front portion of the viewer are disposed generally normal to said bottom and top walls with said tabs engaged between said inner bottom wall and said bottom wall.

* * * * *